United States Patent [19]

Nagaishi

[11] Patent Number: 5,265,175
[45] Date of Patent: Nov. 23, 1993

[54] DATA REGISTRATION AND SEARCH METHOD

[75] Inventor: Tomio Nagaishi, Yokohama, Japan

[73] Assignee: Konica Corporation, Tokyo, Japan

[21] Appl. No.: 734,665

[22] Filed: Jul. 23, 1991

[30] Foreign Application Priority Data

Jul. 25, 1990 [JP] Japan .................. 2-196699

[51] Int. Cl.$^5$ .......................................... G06F 15/417
[52] U.S. Cl. .................................. 382/40; 395/600
[58] Field of Search ................. 382/61, 40, 57; 395/600

[56] References Cited

U.S. PATENT DOCUMENTS

| | | | |
|---|---|---|---|
| 4,677,550 | 6/1987 | Ferguson | 364/300 |
| 4,794,528 | 12/1988 | Hirose et al. | 364/300 |
| 4,823,306 | 4/1989 | Barbic et al. | 364/900 |
| 4,907,283 | 3/1990 | Tanaka et al. | 382/40 |
| 5,121,493 | 6/1992 | Ferguson | 395/600 |

Primary Examiner—Leo H. Boudreau
Assistant Examiner—D. R. Anderson
Attorney, Agent, or Firm—Finnegan, Henderson, Farabow, Garrett & Dunner

[57] ABSTRACT

A method of searching a plural pre-registered data lines in which each of the data lines has data units such as letters and an index number, and of registering a new data line which also has data units among the data lines. The index number indicates the number of the coinciding letters from the first letter between each of the data lines and a data line one preceding to the data line. The method includes the step of comparing the new data line with the first ordered data line among the pre-registered data lines according to alphabetical order. If the new data line is not the same as the first ordered data line, other pre-registered data lines are searched in order to determine an order of the new data line to be registered among the pre-registered data lines. For the determination of the order; firstly, the number of coinciding letters from the first letter between the new data line and the first ordered data line is recognized as a reference number; and secondly, only pre-registered data lines which have equal or larger index numbers than the reference number is searched according to the index numbers.

3 Claims, 11 Drawing Sheets

FIG. 1

|      | SC | R       |
|------|----|---------|
| (i)  | 0  | ABCDEAC |
| (ii) | 5  | ABCDEBD |
| (iii)| 2  | ABDFG   |
| (iv) | 0  | BCD     |

REGISTRATION TABLE

| | SC | R |
|---|---|---|
| (i) | 0 | A B |
| (ii) | 2 | A B C |

REGISTRATION TABLE

FIG. 4

| | SC | R |
|---|---|---|
| (i) | 0 | A B |
| (ii) | 1 | A D C |

REGISTRATION TABLE

FIG. 5

| | SC | R |
|---|---|---|
| (i) | 0 | A B |
| (ii) | 2 | A B D |

REGISTRATION TABLE

|     | SC | R   |
|-----|----|-----|
| (i) | 0  | ABC |
| (ii)| 2  | ABD |

REGISTRATION TABLE

F I G. 7(b)

|      | SC | R   |
|------|----|-----|
| (i)  | 0  | AB  |
| (ii) | 2  | ABC |
| (iii)| 2  | ABD |

REGISTRATION TABLE

FIG. 8(a)

| | SC | R |
|---|---|---|
| (i) | 0 | ABD |
| (ii) | 2 | ABE |

REGISTRATION TABLE

FIG. 8(b)

| | SC | R |
|---|---|---|
| (i) | 0 | ABC |
| (ii) | 2 | ABD |
| (iii) | 2 | ABE |

REGISTRATION TABLE

FIG. 9(a)

|     | S C | R   |
| --- | --- | --- |
| (i) | 0   | A B C |
| (ii)| 2   | A B D |

REGISTRATION TABLE

FIG. 9(b)

|      | S C | R   |
| ---  | --- | --- |
| (i)  | 0   | A B C |
| (ii) | 2   | A B D |
| (iii)| 2   | A B E |

REGISTRATION TABLE

FIG. 10(a)

|     | SC | R   |
| --- | -- | --- |
| (i) | 0  | ABC |
| (ii)| 2  | ABE |

REGISTRATION TABLE

FIG. 10(b)

|      | SC | R   |
| ---  | -- | --- |
| (i)  | 0  | ABC |
| (ii) | 2  | ABD |
| (iii)| 2  | ABE |

REGISTRATION TABLE

FIG. 11(a)

|     | SC | R   |
|-----|----|-----|
| (i) | 0  | ABC |
| (ii)| 2  | ABE |
| (iii)| 1 | AZ  |

REGISTRATION TABLE

FIG. 11(b)

|      | SC | R   |
|------|----|-----|
| (i)  | 0  | ABC |
| (ii) | 2  | ABE |
| (iii)| 2  | ABF |
| (iv) | 1  | AZ  |

REGISTRATION TABLE

FIG. 12(a)

| | SC | R | |
|---|---|---|---|
| (i) | 0 | ABC | REGISTRATION TABLE |
| (ii) | 2 | ABE | |
| (iii) | 3 | ABEF | |

FIG. 12(b)

| | SC | R | |
|---|---|---|---|
| (i) | 0 | ABC | |
| (ii) | 2 | ABE | REGISTRATION TABLE |
| (iii) | 3 | ABEF | |
| (iv) | 2 | ABF | |

DATA REGISTRATION AND SEARCH METHOD

BACKGROUND OF THE INVENTION

The present invention relates to a data registration and search method which may be favorably applied to a facsimile apparatus or the like wherein data lines of telephone numbers or persons' names need to be registered.

In a facsimile apparatus, data lines of telephone numbers or persons' names are registered together with their corresponding coded numbers, so that the coded numbers may be used later for connecting telephone lines.

Figure 13:
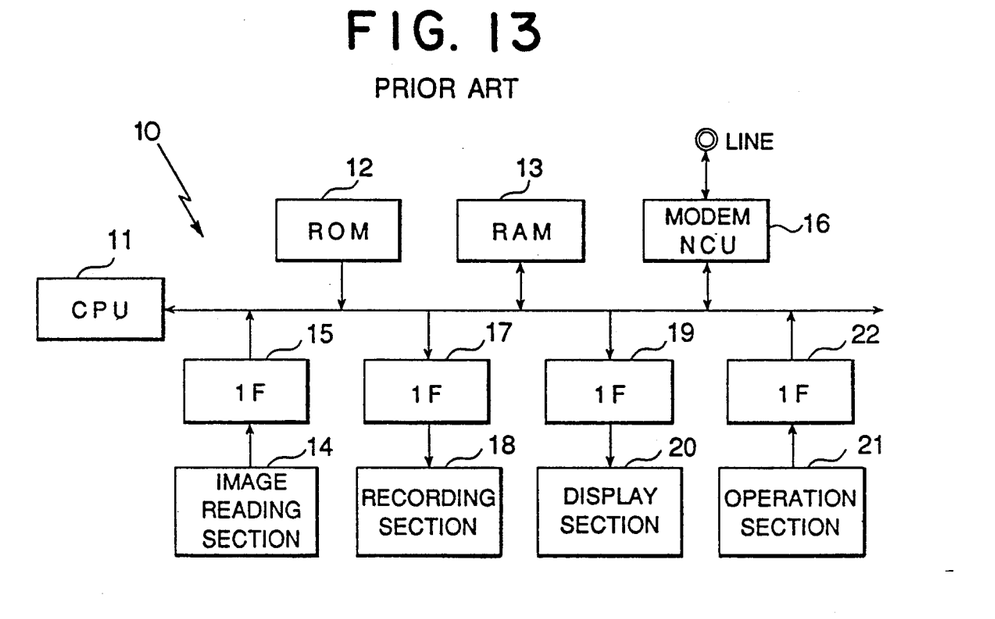
FIG. 13 is a block diagram of a communication control means of a facsimile apparatus.

On a facsimile apparatus, therefore, there is provided communication control means 10 shown in FIG. 13.

In the FIG., 11 is a CPU that conducts communication control. The numeral 12 is a ROM wherein various control programs are stored, and 13 is a RAM wherein image information to be transmitted is stored.

Image information read by image reading unit 14, after being stored in RAM 13 through interface 15, is supplied to a modem, that functions directly as a transmitting and receiving means, MODEM NCU 16.

Image information inputted from the circuit is supplied to recording unit 18, such as a printer through the modem, NCU 16 and interface 17, to be recorded.

The telephone number of a partner to receive a transmission is supplied to display unit 20 through interface 19 to be displayed. The key input inputted from operation unit 21 is supplied to CPU 11 through interface 22, and the contents of key operation are analyzed.

In the facsimile apparatus mentioned above, when searching for the name of a registered communication partner, a searching method mentioned below is conventionally used.

Figure 14:
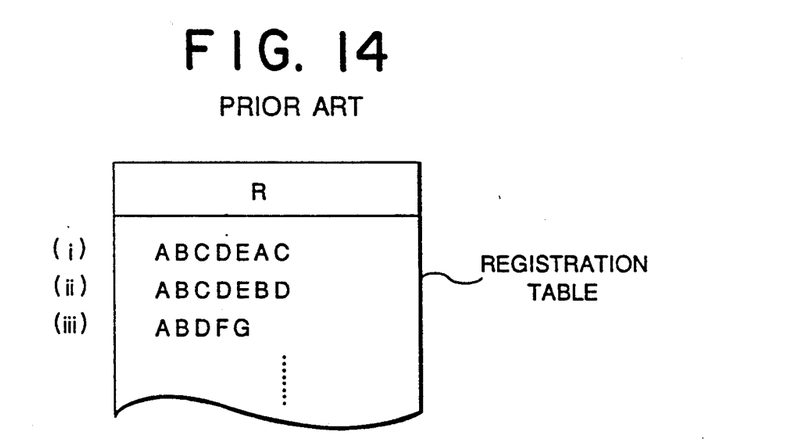
FIG. 14 is an illustration of a conventional search process.

In FIG. 14, it is assumed that there is data line REQ to be searched in which the letters "ABCDEF" are registered, and there are data lines as shown in R.

When the apparatus searches a data line in which the first six letters of search data line REQ coincide, coincidence between registered data line i and the search data line at each letter of the data line i is checked from the first letter in succession. When different letters are discovered within the six letters of REQ, succeeding data line ii is checked in the same manner from the first letter again for coincidence.

In the conventional searching method, as stated above, in case of disagreement between two data lines, the succeeding data line is searched in the same manner from its first letter.

However, in the case of data line i and data line ii both in FIG. 14, when the apparatus checks data line ii, it is not necessary to check from the first letter in the same way, since data line i and data line ii have the same first five letters.

In the conventional method, all letters in each data line are checked from the first letter. When a data line is long, therefore, searching takes a long time.

In this connection, the invention is free from the problems mentioned above, and it offers a data searching method requiring less searching time and a data registering method requiring less registration time.

SUMMARY OF THE INVENTION

In order to solve the above-described problems, a data registering method for searching data lines in series in the first embodiment is characterized in that the present data line to be registered is compared with its preceding data line, and the number of the same letters from the first letter between them is registered as additional information, together with the data line to be registered.

The second embodiment is characterized in that when the apparatus searches a data line having coinciding contents to a searching data line among registered data lines wherein the number of the same letters from the first letter on a preceding data line is stored as additional information to each registered data line, the comparison between the searching data and the first registered data line is conducted from the first letter to obtain the reference data that is the coinciding letters between those data lines at that time, and when the first registered data does not coincide with to the searching data, the comparisons to the second registered letter and thereafter are conducted by searching only data lines having additional information that has an equal or greater number of letters than to that of the above-described reference data.

Figure 1:
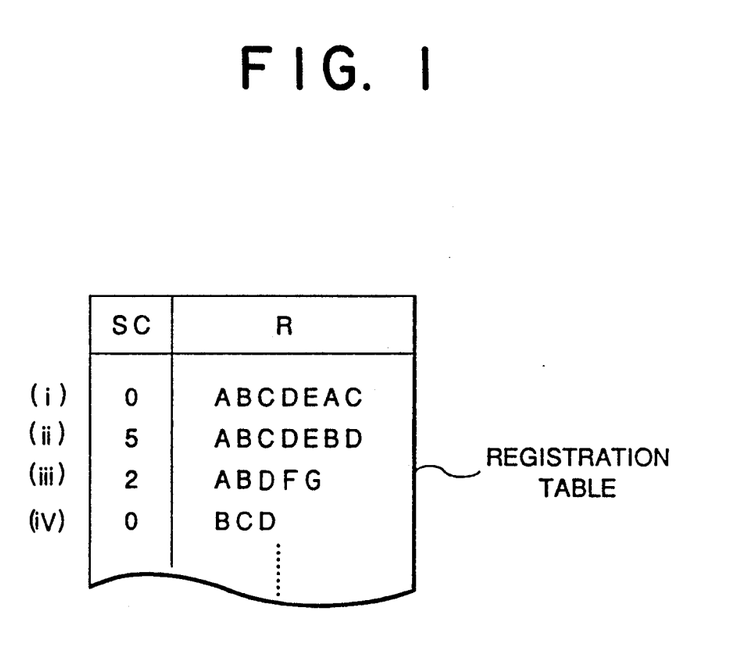
FIG. 1 is an illustration showing a method of data search of the invention.

First, in FIG. 1, the number SC which is the number of the same letters from the first letter between the data line to be registered and its preceding data line among the registered data lines is added to the data line to be registered for its registration. If data line i in FIG. 1 is the first data line to be registered, the number SC which is the additional information of the data line i is 0. For the data line ii to be registered next, SC=5 because the number of coinciding letters between those data lines from the first letter is 5. In the same way, all the data lines to be registered obtain the additional information when they are registered.

With regard to the registration position of a data line, the registration is made beginning from a data line having the first letter which is earlier in the alphabetical order, by referring to additional information SC added to data lines already registered, and additional information SC which is added to the data line to be registered is calculated at that time and added to the data line.

Searching for the data line which has been registered is made depending on the relation between the data line to be searched and additional information (the number of the same data) of each of the registered data lines. With regard to the first data line, searching is made in succession beginning with its first letter, and when different letters appear, the second data line is searched. In that case, searching is omitted up to the number of the letters identical to the number SC of the second data line, and searching is conducted for the letters thereafter.

The basis for the foregoing is that up to the letters of the number the same as the number SC, the data line is the same as the preceding data line having the number SC.

Thereby, overlapped searching can be avoided. Details of the data registration and search method are described in examples of the invention.

DETAILED DESCRIPTION OF THE INVENTION

Referring to FIG. 1 and thereafter, an example of data registration and search method of the invention will be explained in detail as follows.

FIG. 1 shows the constitution of basic data lines for realizing the invention.

As an assumption, in the sequence of registration for data lines, registration of letters is made in alphabetical order.

In FIG. 1, to each of data lines to be registered in a registration table, the number SC representing a number of the same letters between a data line to be registered and its immediately preceding data line (from the viewpoint of address) is added to the data line to be registered as additional information.

In the example shown in FIG. 1, the first data line i does not have a data line to be compared with the first data line. In this case, therefore, the additional information SC is zero (SC=0).

In the following data line ii, as it is compared with its immediately preceding data line i, the first 5 letters (in this example) are the same, which means that SC is 5 (SC=5).

In the same manner, SC is 2 (SC=2) for data line and SC is zero (SC=0)for data line iv.

When registering data lines as stated above, the number of the same data SC between the data line to be registered and its immediately preceding data line is registered concurrently as additional information.

When searching a data line having a certain content whose additional information SC has been registered, the additional information SC is to be referred.

In the figure, for example, when the data line to be searched is represented as REQ ="ABCDEF", searching therefor is as follows.

The first data line i is checked first, and it is detected that the first five letters are the same as REQ and the sixth letter is different. Then the following data line is checked. In this case, since the number SC of the same data is 5, searching can be omitted up to the 5th letter and is started from the 6th letter.

Since the 6th letter is different in a search of data line ii, the following data line iii is searched. Since the number SC of the data line iii is not more than 5, there is no coinciding data thereafter. Therefore, the searching process is stopped.

Figure 2:
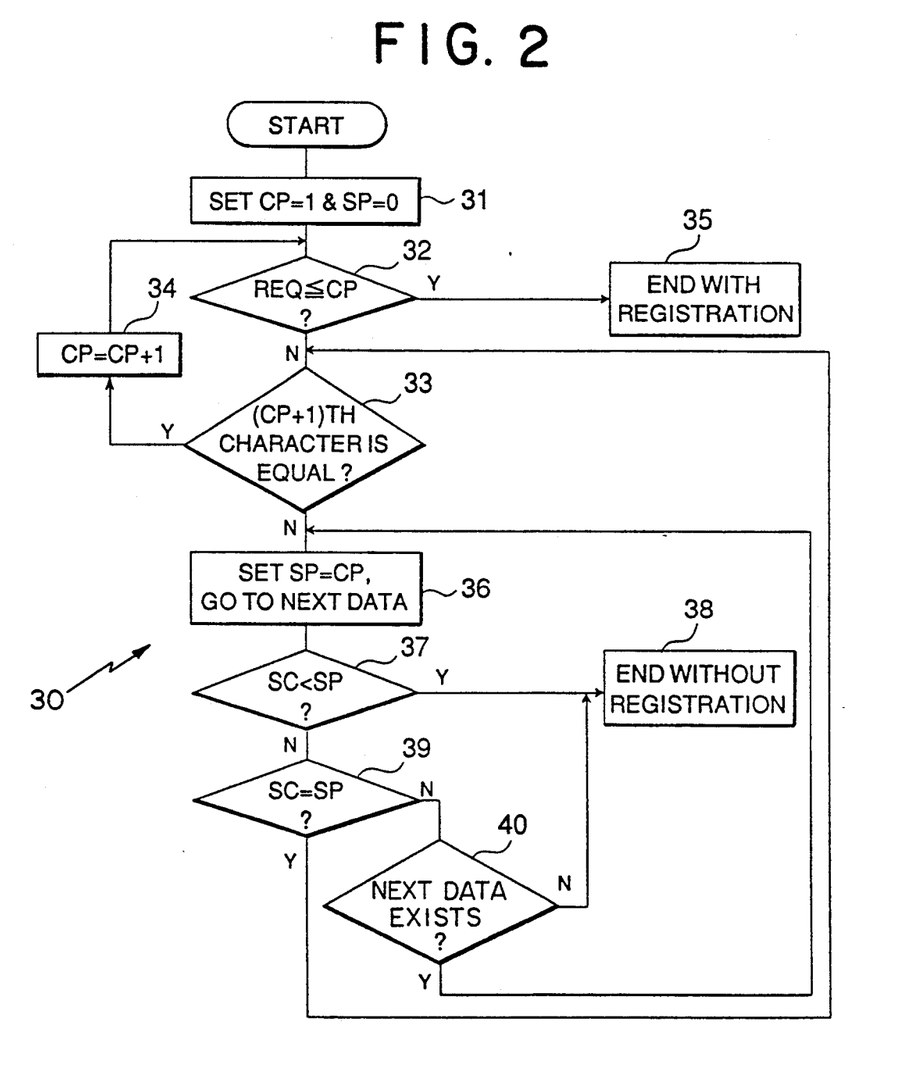
FIG. 2 is a process flow showing an example of search processing thereof.

FIG. 2 shows an example of process flow 30 for carrying out the searching process mentioned above.

The process flow 30 is a process flow succeeding the detection of coincidence between the first letter of a data line and the first letter on data line REQ to be searched.

Before explaining the process flow 30, definitions are made as follows in addition to the one defined above.

SP is the number of the same letters confirmed between the data line REQ and the preceding data line.

CP is a counted value by means of a counter that counts the number of letters which are the same in the data line REQ.

After the process flow 30 is started and coincidence of the first letter between two data lines is confirmed, setting is made (step 31) to CP=1 and SP=0, and then discrimination between the number of letters in the data line REQ to be searched and CP is made (step 32).

Figure 3:
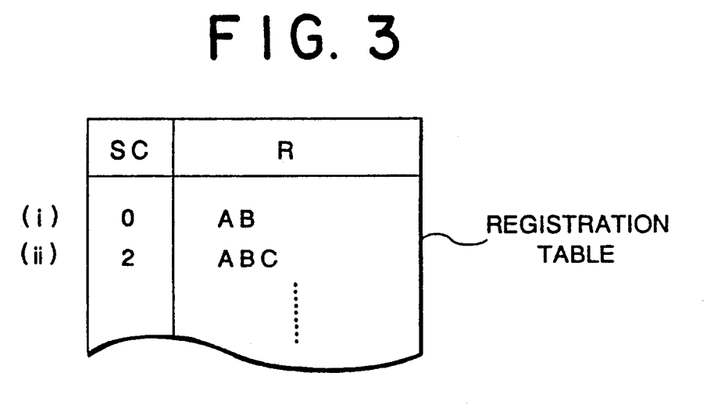
FIGS. 3-5 represent registration lines.

FIG. 3 shows an occasion wherein data line REQ to be searched ="ABC" (=3), In this case, the process advances to the following step 33 wherein the (CP+1)th letter is checked as to whether it is the same or not (step 33). Because R is "AB" in the registered data line, the second letter is also the same. Therefore, the value of CP is increased by one (step 34) and comparison between REQ and CP is made again (step 32).

Even in this case, the relation between REQ and CP does not satisfy the relation of step 32. Therefore, searching for the following (CP+1)th letter is started (step 33). Since only two letters are registered for the data line i, setting is made to the condition of SP=CP before going to the following data line ii (step 36).

Then, in step 37, the relation between SP and SC for the data line mentioned above is checked. Since this relation is not satisfied, the coincidence between SP and SC is checked in the following step 39. Because of the coincidence between them in this particular example, the process goes back to step 33 again, and the comparison between (CP+1)th letters (namely, the third letter) in data line ii is made (step 33).

Because of the coincidence between them in the above-described example, CP is increased by one (CP=3) and it is compared with REQ (=3) in step 32. Since they coincide, the search processing is terminated with the assumption that there is a registered data line in this case (step 35).

Figure 4:
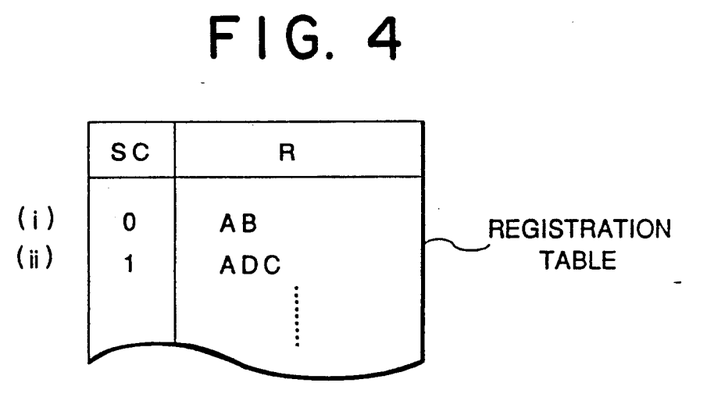

To the contrary, in the case of data lines in FIG. 4, searching for data line i is terminated because SC is 1 in data line i, and advancing to the following data line ii (steps 36 and 37). When SC and SP are subjected to comparison in step 37, REQ and data line ii do not satisfy the conditions of either step 37 or step 39. Therefore, the process advances to step 40.

In the example in FIG. 4, since there is no registered data line after data line ii, searching is terminated, it being judged that there is no registered data line to search for after data line ii in this case (step 38).

Figure 5:
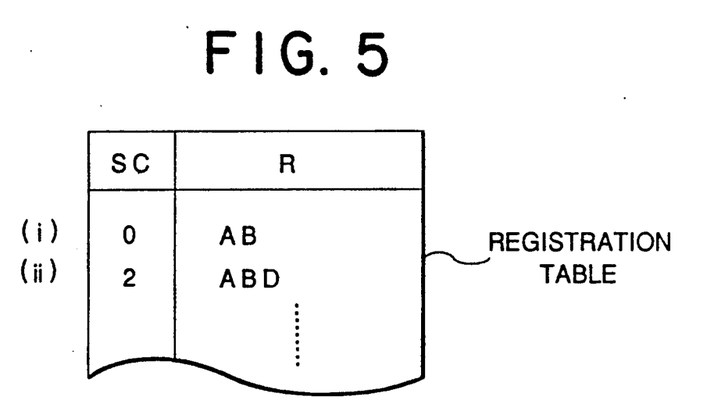

In the case of data lines shown in FIG. 5, since judgment whether SC is equal to SP is made in step 39, the process returns to step 33 in this case. Since the disagreement of the third letter between them is detected in the step 33, the process tries to advance to the next data line. However, since there is no succeeding data line to search, SC is zero (SC=0). Accordingly, searching is terminated with judgment that there is no registered data line also in this case (steps 37 and 38).

As stated above, data line searching is made with SC as a reference so that searching may not be made for the same letter lines.

Next, registration procedures of data lines for shortening the search time and an example of calculation for additional information SC to be added thereto will be explained as follows, referring to FIG. 6 and thereafter.

After the process flow 50 is started and coincidence of the foremost letter is confirmed, setting to CP=1 and SP=0 is made (step 51) and then the number of letters in data line REQ and CP are subjected to discrimination (step 52).

Figure 7A:
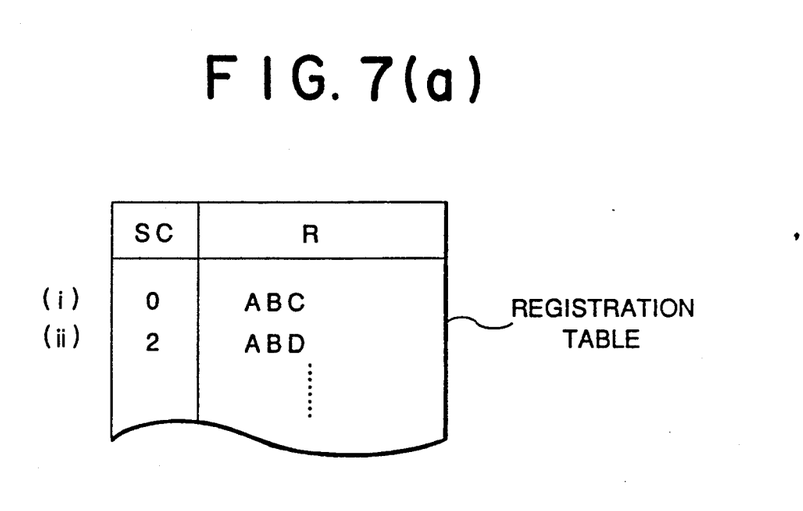

An assumption in FIG. 7 (a) is that data line REQ to be registered is "AB" (=2). In this case, the process advances to the following step 53 where checking whether the (CP +1)th letter is the same or not is made. Since the registration data line gives R ="AB", the second letters coincide. Therefore, the value of CP is increased by one to be 2 (step 54) and REQ is compared again with CP (step 52).

Since both REQ and CP coincide in step 52, the process advances to step 55 where the data line REQ is inserted before the data line i to be registered. Then SC of the following data line (corresponding to data line i before insertion) is made to satisfy SC=SP, and SC of data line to be inserted is made to satisfy SC=SP.

Figure 7B:
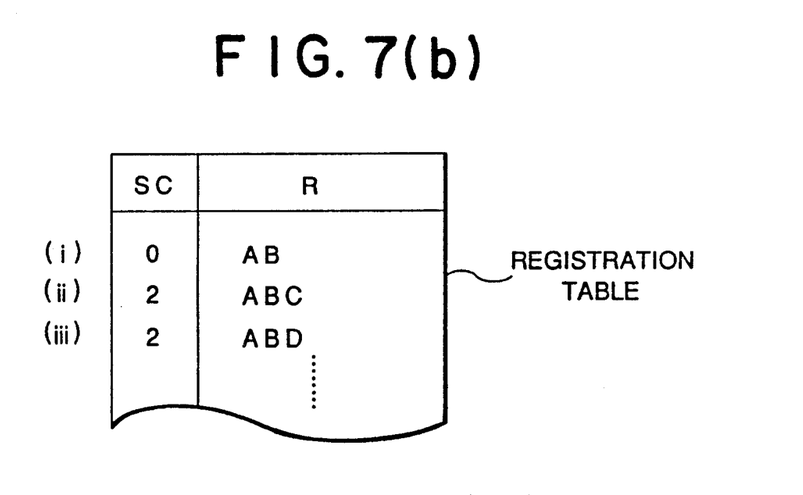

In this example, because of SC=CP=2 and SC=SP=0, data line R after registration takes the form shown in FIG. 7 (b).

Figure 8A:
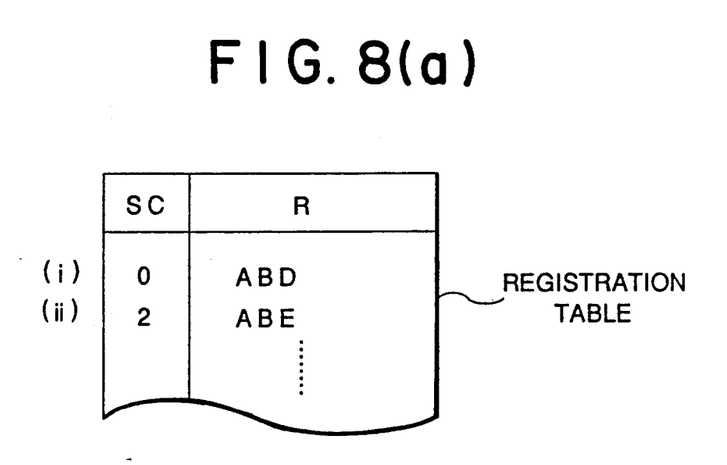
Figure 8B:
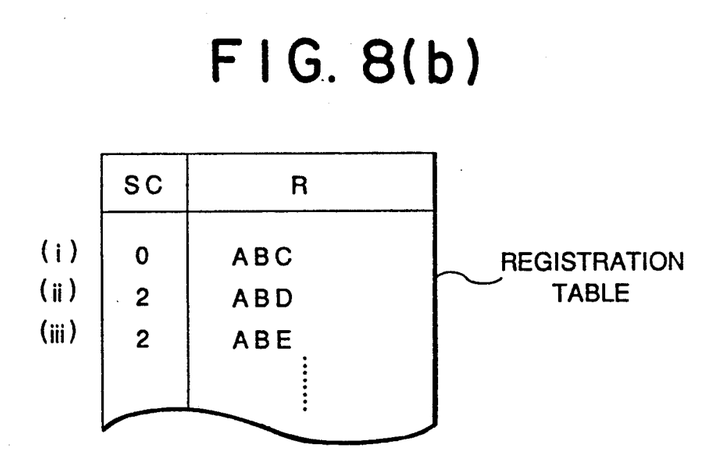

As an example wherein data to be compared next do not coincide in step 53, FIGS. 8 (a) and (b) are given. In FIG. 8 (a), when a data line to be registered satisfies REQ ="ABC", the coincidence of the second letters and disagreement of the third letters is detected in step 53, judgment is made in step 56 as to whether the (CP+1)th letter of the data line i precedes the (CP+1)th letter of data line REQ in alphabetical order. In this particular example, it precedes, and therefore, the process goes to step 57.

Thus, data line REQ ("ABC")to be registered is inserted before the first registration data line i ("ABD"). SC of data line i to be the next data line ii is made to satisfy SC=CP =2, and SC of the data line REQ is made to satisfy SC=SP=D. Therefore, the data line R after registration takes the form shown in FIG. 8 (b).

When letters to be inserted at step 56 are later in alphabetical order than those of a data line, the value of CP is set in step 58 as a value of SP, and after that, the existence of the line data is confirmed.

Figure 9A:
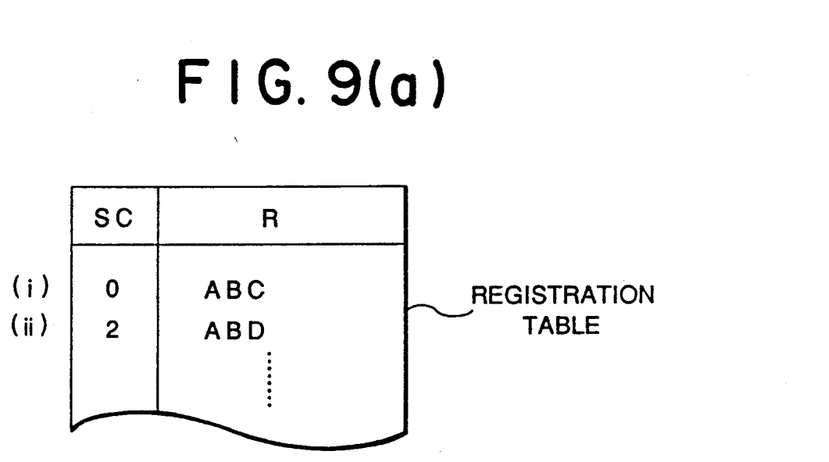

Under the condition of REQ="ABE", for example, when data lines are only two, i and ii, and the (CP+1)th letter ("E") of a data line to be registered is later in order than the (CP+1)th letter ("D") of the last data line ii, the process goes to step 60.

Figure 9B:
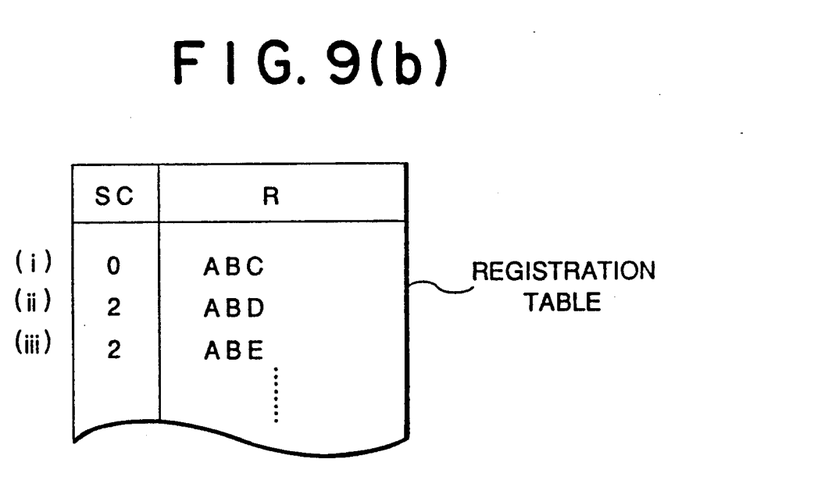

Thus, data line REQ =ABE can be inserted in the rear of the last registration data line R=ABD, and SC of the data line to be inserted satisfies the condition of SC=SP=2. Therefore, the data line after being registered takes the form shown in FIG. 9 (b).

When succeeding registered data exists in step 59, the following processes are started. FIG. 10 will be shown first.

Figure 10A:
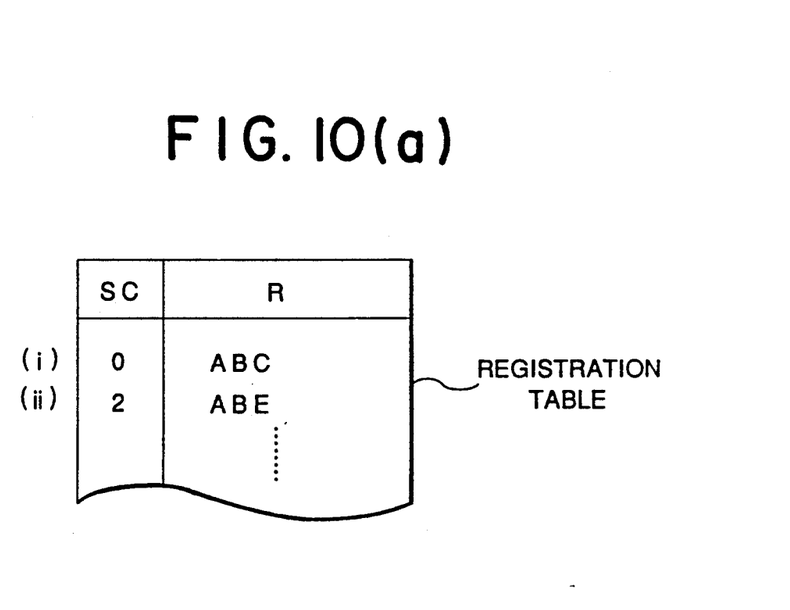
Figure 10B:
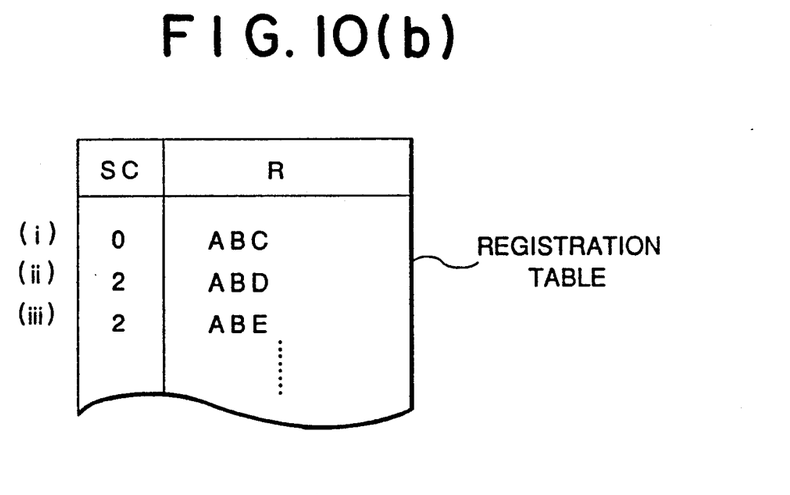

In case of REQ ("ABD") in FIG. 10 (a), since the data to be inserted is later in order as a result of comparison with the third letter in data line i, the process advances to steps 56, 58, 59 and 61, and at step 61, SC of data line ii and SP are compared. Because SP=CP=2, the process returns to step 53 and a comparison with the third letter in data line ii is made. However, since the comparison shows disagreement and letter "D" to be inserted is earlier in order than the third letter of data line ii, the insertion is made in step 60. Therefore, the data line R after registration takes the form shown in FIG. 10 (b). This is the same as examples in FIGS. 8 (a) and (b).

Figure 11A:
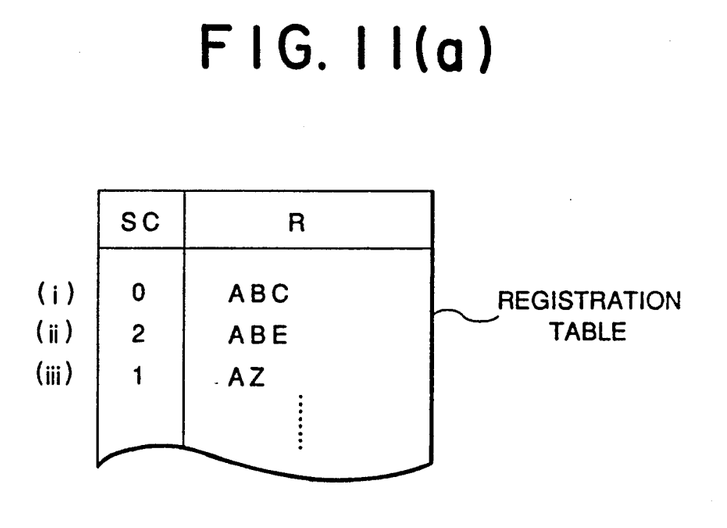
Figure 11B:
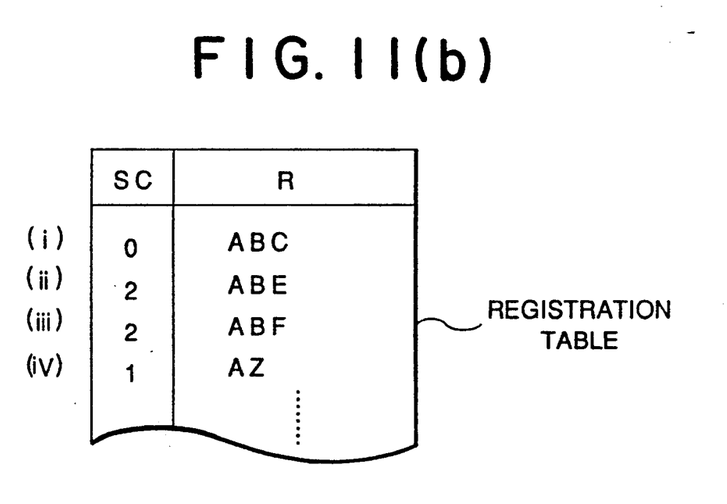

FIG. 11 (a), on the other hand, shows an occasion where the data line to be inserted is later in order and the process advances from step 56, through steps 58 and 59, up to steps 61 and 62 where SC in data line iii and SP are compared. Due to REQ="ABF", SC=1 and SP=2 in the present example, the process goes to step 63 where data line of REQ ("ABF") is inserted before the data line iv ("AZ"). SC in this case remains unchanged and SC of the data line to be inserted becomes SP.

Figure 12A:
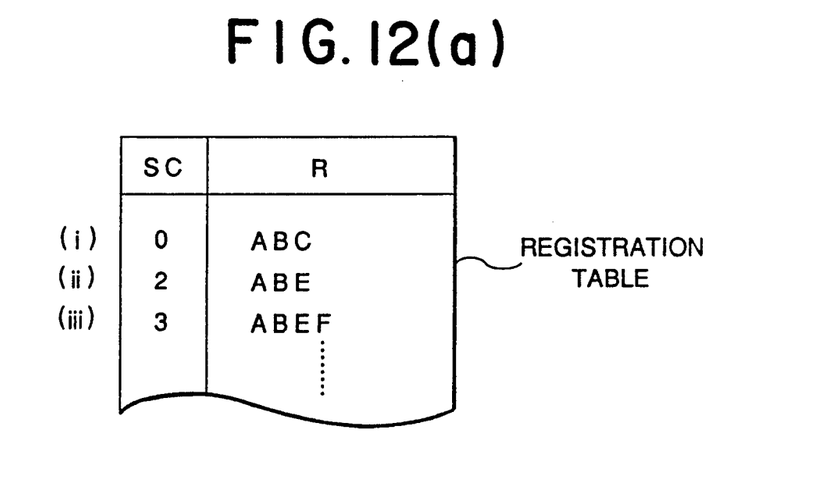
Figure 12B:
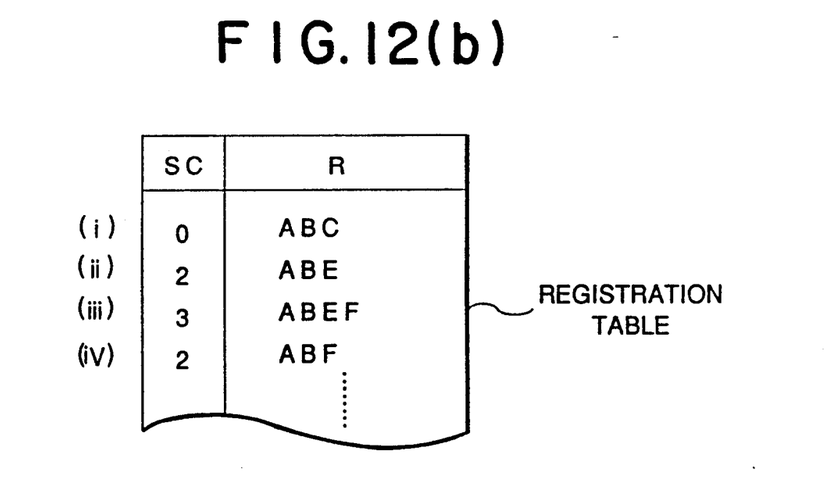

FIG. 12 (a) shows an occasion of REQ="ABF", SC=3 and SP=2 (step 62). In this case, the process returns to step 58 and goes, after confirming no succeeding data lines, to step 60 where data line REQ ="ABF" is inserted in the rear of the data line iii ("ABEF") to take the form shown in FIG. 12 (b)

When following the above-mentioned steps, it is possible to register data lines in the sequence shown in FIG. 1 (b) and it is further possible to add to each registered data line its own additional information SC.

Figure 6:
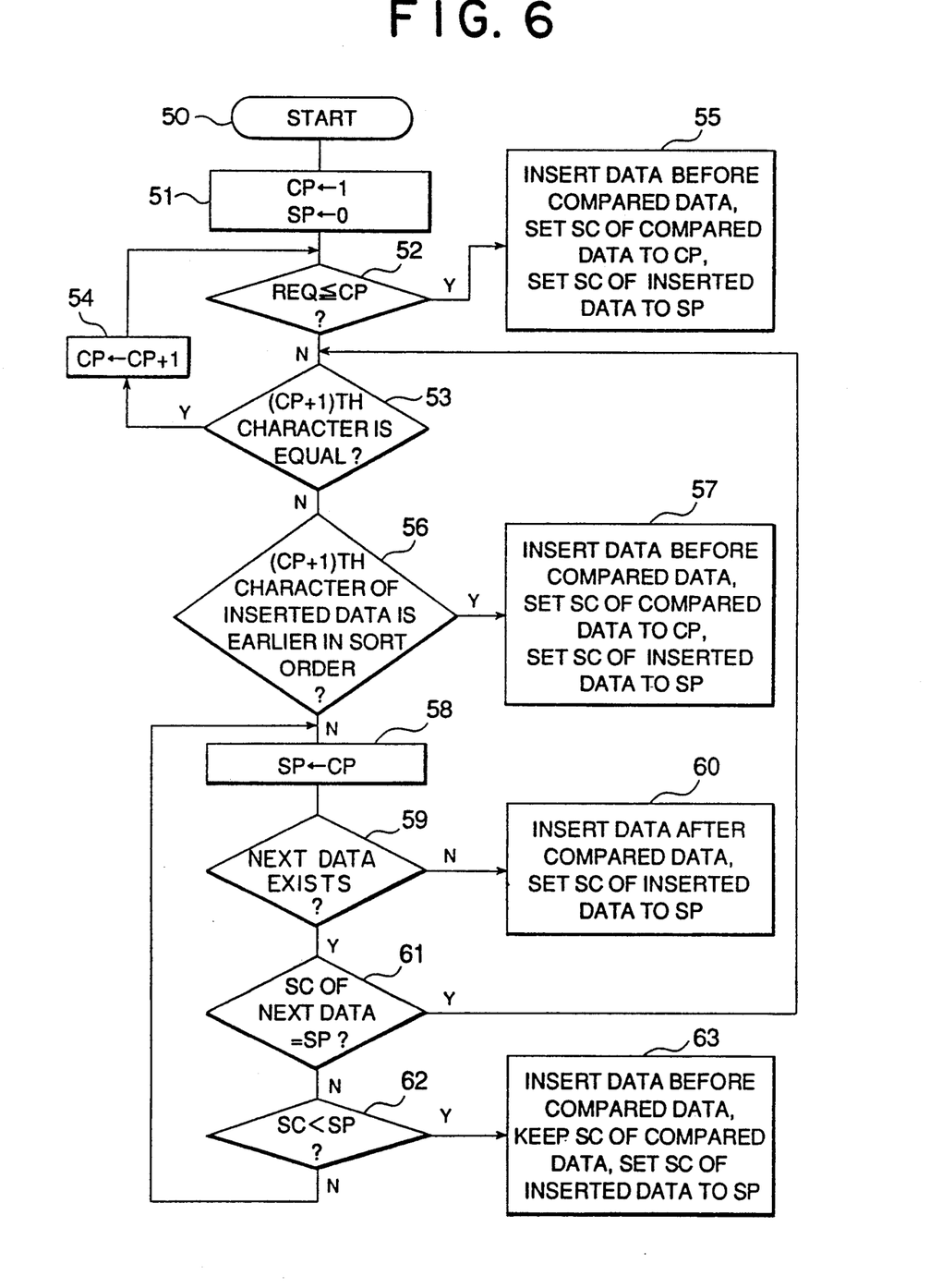
FIG. 6 is a process flow showing an example of the data registration process, FIGS. 7a,b-12a,b represent registration lines.

Incidentally, the process flows shown in FIGS. 2 and 6 are stored in ROM 12 shown in FIG. 13.

As explained above, it is possible to shorten search time for data lines through simple processing in the invention, and it is further possible to register the data lines which realize the foregoing.

Therefore, the present invention can be applied favorably to a facsimile apparatus and others wherein data need to be registered and searched.

What is claimed is:

1. A method for searching a plurality of pre-registered data lines wherein each one of said pre-registered data lines consists of one or more data units, and for registering a new data line, consisting of one or more data units, among said pre-registered data lines, comprising the steps of:

identifying a position for said new data line in comparison with said pre-registered data lines according to a predetermined ordering method;

counting a number of coinciding data units, beginning from a first data unit, between said one or more data units of said new data line and one or more data units of an old data line, which is one of said pre-registered data lines and which is determined to be one preceding to said new data line according to said predetermined ordering method, when said new data line is in a position following after said old data line;

registering said new data line, with said number of coinciding data units as in index number, in a position following after said old data line when said new data line is determined to be following said old data line according to said predetermined ordering method; and registering said new data line, with a number of 0 as said index number in a position at the beginning of said plurality of pre-registered data lines when said new data line is determined to be preceding to said pre-registered data lines according to said predetermined ordering method, wherein every data line has an associated index number.

2. The method according to claim 1, wherein said identifying step is carried out through the use of said index number.

3. A method for searching a plurality of pre-registered data lines wherein each one of said pre-registered data lines consists of one or more data units, and for registering a new data line, consisting of one or more data units, among said pre-registered data lines, comprising the steps of:

counting a number of coinciding data units, beginning from a first data unit, between said one or more data units of said new data line and one or more data units of an old data line, which is one of said pre-registered data lines and which is determined to be one preceding to said new data line according to a predetermined ordering method, when said new data line is in a position following after said old data line;

registering said new data line, with said number of coinciding data units as an index number, in a position following after said old data line when said new data line is determined to be following said old data line according to said predetermined ordering method;

registering said new data line, with a number of 0 as said index number, in a position at the beginning of said plurality of pre-registered data lines when said new data line is determined to be preceding to said pre-registered data lines according to said predetermined ordering method; and identifying a position for said new data line in comparison with said pre-registered data lines according to said predetermined ordering method through the use of said indexing numbers by comparing said new data line with a first ordered data line among said pre-registered data lines so that a number of data units, beginning from a first data unit of said one or more data units in said new data line, coinciding with corresponding one or more data units of said first ordered data line is obtained as a reference number; and determining said position of said new data line in comparison with second and later ordered data lines among said pre-registered data lines according to said predetermined ordering method, by comparing said reference number with said index numbers of said second and later ordered data lines sequentially while said index number of each of sad second or later ordered data lines is not less than said reference number, and when said new data line is different from said first ordered data line in contents thereof.

* * * * *

UNITED STATES PATENT AND TRADEMARK OFFICE
CERTIFICATE OF CORRECTION

PATENT NO. : 5,265,175
DATED : November 23, 1995
INVENTOR(S) : Tomio Nagaishi

It is certified that error appears in the above-indentified patent and that said Letters Patent is hereby corrected as shown below:

\* Claim 1, column 6, line 37, change "in" (first occurrence) to --an--.

\* Claim 3, column 8, line 12, change "sad" to --said--.

Abstract, line 1, change "a plural" to --plurality of--.

Abstract, line 15, change "order;" to --order:--.

Abstract, line 19, change "is" to --are--.

Signed and Sealed this

Thirtieth Day of August, 1994

Attest:

BRUCE LEHMAN

*Attesting Officer*  *Commissioner of Patents and Trademarks*